(12) United States Patent
Hatakeyama

(10) Patent No.: US 10,712,622 B2
(45) Date of Patent: Jul. 14, 2020

(54) DISPLAY DEVICE AND MANUFACTURING METHOD THEREOF

(71) Applicant: Japan Display Inc., Tokyo (JP)

(72) Inventor: Eisuke Hatakeyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/679,407

(22) Filed: Nov. 11, 2019

(65) Prior Publication Data

US 2020/0073166 A1 Mar. 5, 2020

Related U.S. Application Data

(63) Continuation of application No. 16/197,449, filed on Nov. 21, 2018, now Pat. No. 10,503,025, which is a (Continued)

(30) Foreign Application Priority Data

Oct. 1, 2012 (JP) .................................. 2012-219420

(51) Int. Cl.
*G02F 1/1345* (2006.01)
*G02F 1/1337* (2006.01)
(Continued)

(52) U.S. Cl.
CPC ........ *G02F 1/13454* (2013.01); *G02F 1/1337* (2013.01); *G02F 1/1339* (2013.01); (Continued)

(58) Field of Classification Search
CPC ............. G02F 1/13454; G02F 1/13394; G02F 1/133351; G02F 1/1337; G02F 1/1339; G02F 2001/13396
See application file for complete search history.

(56) References Cited

U.S. PATENT DOCUMENTS

| 2002/0063839 A1 | 5/2002 | Matsumoto |
| 2003/0090615 A1 | 5/2003 | Park |

(Continued)

FOREIGN PATENT DOCUMENTS

| JP | 2001-235749 A | 8/2001 |
| JP | 2002-040442 A | 2/2002 |

(Continued)

OTHER PUBLICATIONS

Japanese Office Action dated May 31, 2016 for corresponding Japanese Patent Application No. 2012-219420.

(Continued)

*Primary Examiner* — Phu Vu
(74) *Attorney, Agent, or Firm* — Michael Best & Friedrich LLP

(57) ABSTRACT

In a display device having high reliability, even if being a narrow framing type, and a method for manufacturing thereof, having a display panel, being made up with a first substrate 101 and a second substrate 201, which are adhered with using a seal 301, a main SOC 302 is disposed like a wall, on a peripheral end portion of the first substrate 101 and the second substrate 201, and the seal 301 is disposed inwardly of the main SOC 302. Also, in a method for manufacturing thereof, the main SOC 302 is formed in a region including a cutting plane between the display panel regions neighboring with, and on the cutting plane is made the cutting thereof.

8 Claims, 11 Drawing Sheets

Related U.S. Application Data continuation of application No. 15/988,107, filed on May 24, 2018, now Pat. No. 10,162,221, which is a continuation of application No. 15/189,106, filed on Jun. 22, 2016, now Pat. No. 10,007,152, which is a continuation of application No. 14/791,122, filed on Jul. 2, 2015, now Pat. No. 9,395,585, which is a continuation of application No. 14/034,827, filed on Sep. 24, 2013, now Pat. No. 9,104,073.

(51) Int. Cl.
*G02F 1/1339* (2006.01)
*G02F 1/1333* (2006.01)

(52) U.S. Cl.
CPC .... *G02F 1/13394* (2013.01); *G02F 1/133351* (2013.01); *G02F 2001/13396* (2013.01)

(56) References Cited

U.S. PATENT DOCUMENTS

| | | |
|---|---|---|
| 2004/0150776 A1 | 8/2004 | Kim |
| 2008/0137022 A1 | 6/2008 | Komeno et al. |
| 2011/0074748 A1 | 3/2011 | Cho et al. |
| 2012/0075559 A1 | 3/2012 | Sonoda et al. |
| 2012/0081640 A1 | 4/2012 | Kim et al. |
| 2012/0133874 A1 | 5/2012 | Hoshina et al. |
| 2012/0327347 A1 | 12/2012 | Cho et al. |
| 2013/0009181 A1 | 1/2013 | Daishi et al. |
| 2013/0182207 A1 | 7/2013 | Fukuoka et al. |

FOREIGN PATENT DOCUMENTS

| | | |
|---|---|---|
| JP | 2006-030440 A | 2/2006 |
| JP | 2007-148449 A | 6/2007 |
| JP | 2007-248743 A | 9/2007 |
| JP | 2007-304452 A | 11/2007 |
| JP | 2009-122410 A | 6/2009 |
| JP | 2012-073342 A | 4/2012 |
| JP | 2012-118268 A | 6/2012 |
| JP | 2013-025125 A | 2/2013 |
| JP | 2013-037338 A | 2/2013 |

OTHER PUBLICATIONS

Japanese Office Action dated Dec. 20, 2016 for corresponding Japanese Application No. 2012-219420, with machine translation.

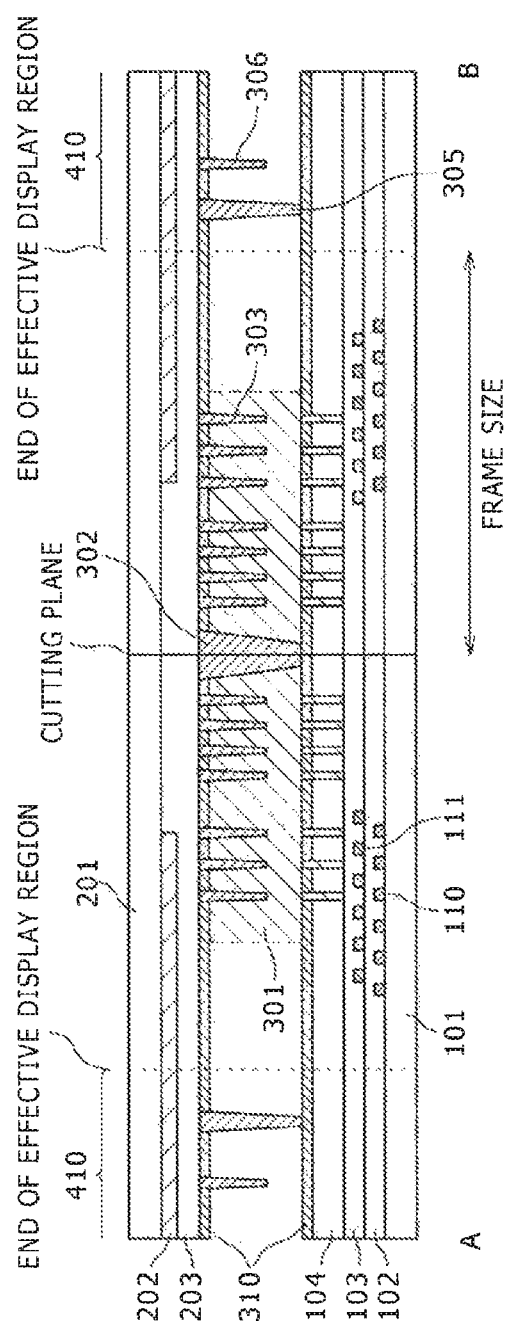

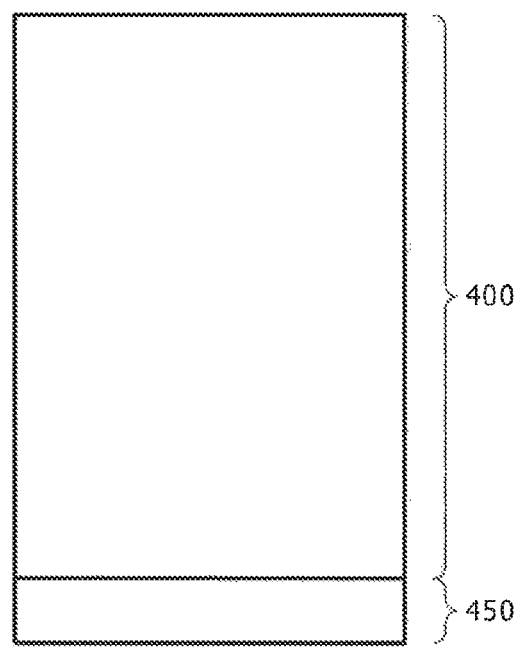
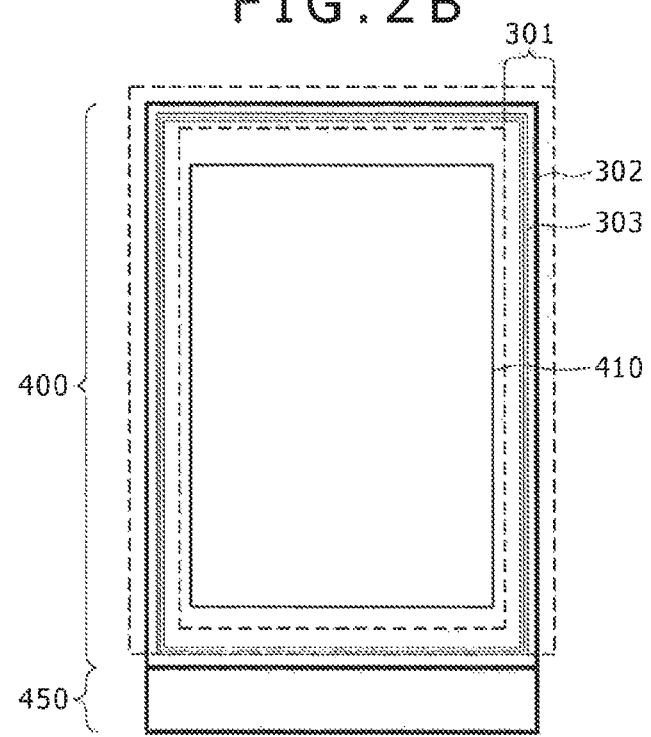

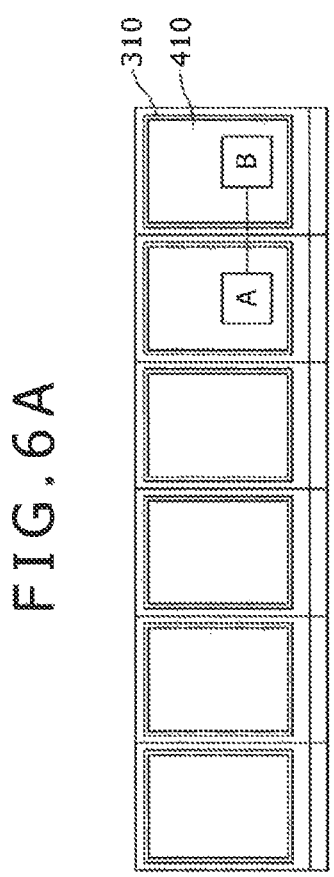

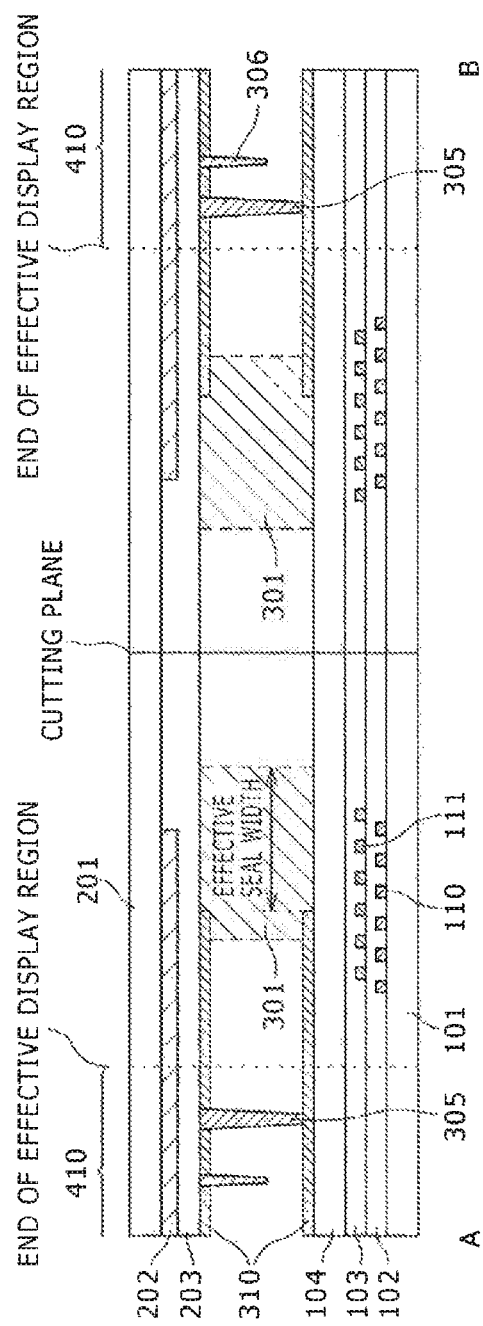

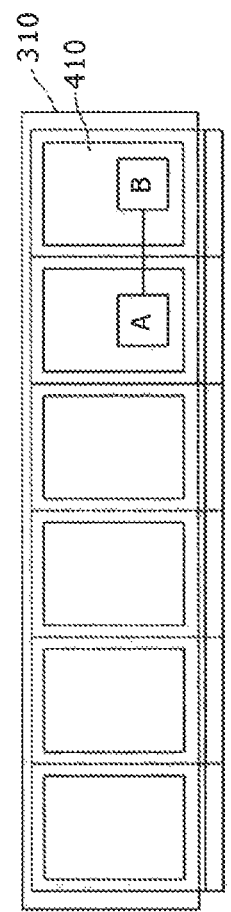

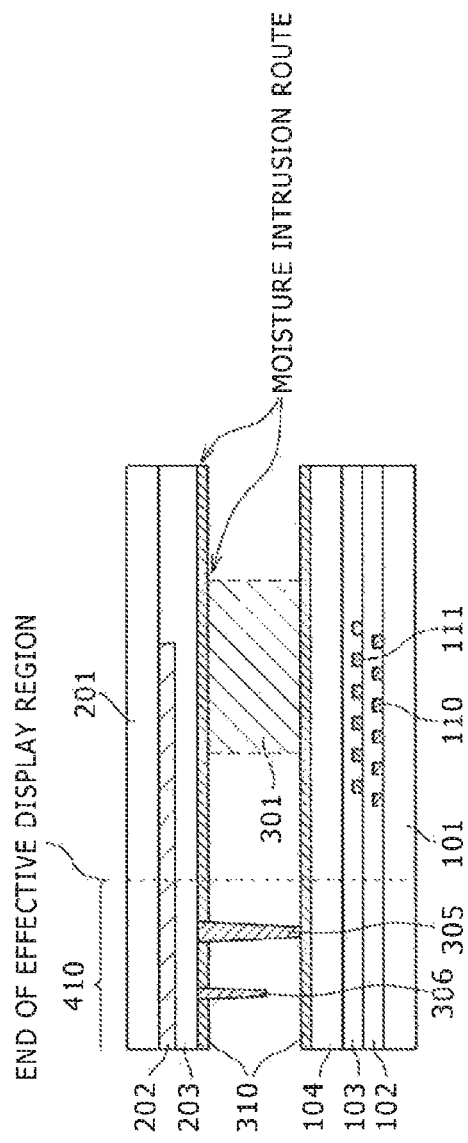

DISPLAY DEVICE AND MANUFACTURING METHOD THEREOF

CROSS-REFERENCE TO RELATED APPLICATIONS

This application is a continuation of U.S. patent application Ser. No. 16/197,449 filed on Nov. 21, 2018, which, in turn, is a continuation of U.S. patent application Ser. No. 15/988,107 (now U.S. Pat. No. 10,162,221) filed on May 24, 2018, which, in turn, is a continuation of U.S. patent application Ser. No. 15/189,106 (now U.S. Pat. No. 10,007,152) filed on Jun. 22, 2016, which, in turn, is a continuation of U.S. patent application Ser. No. 14/791,122 (now U.S. Pat. No. 9,395,585) filed on Jul. 2, 2015, which, in turn, is a continuation of U.S. patent application Ser. No. 14/034,827 (now U.S. Pat. No. 9,104,073) filed on Sep. 24, 2013. Further, this application claims priority from Japanese Patent Application JP 2012-219420 filed on Oct. 1, 2012, the entire contents of which are hereby incorporated by reference into this application.

BACKGROUND OF THE INVENTION

Field of the Invention

The present invention relates to a display device, built up by adhering 2 pieces of substrates with using a seal, and a method, as well, for manufacturing the same.

Description of the Related Art

A display devices, such as, a liquid crystal display device, for example, is spreading application thereof, widely, in various technical fields, because of a flat configuration, a light-weight and an electric power saving thereof. Onto a portable phone (e.g., a mobile phone) and/or a DSC (Digital Still Camera), etc., for example, are applied the small-sized liquid crystal display devices, widely. The display devices, being built up by adhering 2 pieces of substrates with using a seal member therebetween, in particular, relating to the liquid crystal display device, are described in the following Japanese Patent Laid-Open No. 2007-304452; and Japanese Patent Laid-Open No. 2007-140449.

In the Japanese Patent Laid-Open No. 2007-304452 is disclosed a liquid crystal display device, spreading an area of a seal member, which is in contact with a groundwork, by forming a structure provided for excluding an alignment film in an area where the seal member contacts with the alignment film, while forming an end portion of the alignment film within an inside of the seal member, in a terminal connector portion where other substrate extends directing outside from one substrate, and also forming the alignment film in an outside of the seal member, on a side where the end portions those 2 pieces of the substrate are aligned with, for the purpose of maintaining the bonding strength of the seal member, in the liquid crystal display device, being built up with 2 pieces of substrates adhered by the seal member on the periphery of the substrates.

Also, in the Japanese Patent Laid-Open No. 2007-148449 is disclosed a liquid crystal display device, which is manufactured by disposing and baking the seal member, provisionally, on a transparent substrate made of a plastic, and forming a column-like spacer(s) within the seal on a transparent substrate of the plastic, wherein the transparent substrate disposing the seal member and the transparent substrate forming the column-like spacer(s) within the seal are put on each other in such a manner that the column-like spacer(s) within the seal is/are buried into the seal members, and are baked under heating/suppression, to be sealed up on the seal portion thereof, for providing the liquid crystal display device improved in the reliability with respect to sealing thereof, in particular, in a device necessitating a low-temperature manufacturing process, being equal to or lower than 160° C., such as, a STN liquid crystal display device applying a plastic substrate therein, etc.

SUMMARY OF THE INVENTION

Within the display device, such as, the liquid crystal display device, etc., so-called a narrow framing is advanced, i.e., narrowing the frame portion, starting from a panel end portion up to a pixel region (i.e., an effective display region), for the purpose of widening a display screen with respect to an outer configuration thereof, in particular, in the liquid crystal display panel.

FIG. 6A shows a plane view of an outlook of the conventional liquid crystal display panel (before being cut out). As is shown in this figure, an alignment film 310 is formed in a region larger than that of an effective display region 410. Also, FIG. 6B is a cross-sectional view of A-B portion of the liquid crystal panel shown in FIG. 6A. A seal 301 is formed between a color filter (CF) side substrate 201, on which a black matrix film (BM) 202 and an over coating film (OC), etc., and a TFT side substrate (made of glass) 101, on which are formed a silicon nitride film 102 for forming a gate insulation film, an inorganic passivation film (PAS) 103, an upper layer passivation film (UPS) 104 or an organic passivation film (FPS) 104, a gate wiring (GAL) 110, a drain wiring (DCR) 111, etc. Also, the alignment film 310 is formed by printing, on the CF side substrate 201 and the TFT side substrate. A reference numeral 305 denotes a SOC (Space on color filter), which is disposed within the effective display region for the purpose of defining a gap distance between those substrates, while a reference numeral 306 denotes a sub SOC within the effective display region. Also, the same reference numerals denote the same constituent elements, respectively.

Explanation will be given about a manufacturing method by referring to FIG. 8. On the CF side substrate, after forming the over coating film (OC), etc., thereon, the alignment film 310 is printed for each liquid crystal display panel, and a surface of the alignment film is rubbed in a certain direction (i.e., rubbing). Next, a seal 301 is applied on for each liquid crystal display panel. The seal 301 may be applied on the TFT side substrate. On the TFT side substrate, after forming UPS or FPS thereon, the alignment film is printed for each liquid crystal display panel, and the rubbing is made thereon. Thereafter, the CF and the TFT side substrates, on each of which is applied the seal, are piled up with, so that the surfaces, being formed the alignment films thereon, are opposite with each other, and they are bonded.

If the narrow framing is advanced, it is very difficult to keep an effective seal width and a tolerance of size of printing the alignment film. Thus, conventionally, the printing position of the alignment film does not overlap the region where the seal 301 is formed, or a very little if it overlaps, including an error of the printing position of the alignment film; thus, it is possible to maintain the effective seal region (i.e., the region shown by arrows in both directions within the seal 301). However, narrowing the distance between the end portion (i.e., the cutting plane) and an end portion of the effective display region 410 brings a permissible error (i.e., a size tolerance) in the printing position of the alignment film 310 to be restrictive.

The inventors made studies upon the permissible error of the printing position, and reach to a solution of the problem of the permissible error, by forming the alignment films, each of which is printed for each liquid crystal display panel, conventionally, but covering over plural numbers of the liquid crystal panels. Then, the inventors manufactured a liquid crystal display device having such unique structure as mentioned above. FIG. 7A shows a plane view of an outlook of the liquid crystal display panel (before cutting), which the inventors studied. As is shown in this figure, the alignment film 310 is formed covering over every liquid crystal display panel. Also, FIG. 7B is a cross-sectional view of A-B portion of the liquid crystal display panel shown in FIG. 7A. Forming the alignment film 310 covering over the every liquid crystal display panel (i.e., a solid pattern) does not brings about a fluctuation within the region where the alignment film 310 and the seal 301 are overlapping on each other. In those Japanese Patent Laid-Open No. 2007-304452 and Japanese Patent Laid-Open No. 2007-148449 mentioned above, it is not apparent if the alignment film is formed or not, covering over the plural numbers of the liquid crystal display panels.

However, as a result of such structure as mentioned above, so-called a black unevenness or spot is generated, and then it is apparent that the reliability thereof is deteriorated.

An object of the present invention lies to provide a display device having high reliability even if being narrowed with the frame thereof, and a method for manufacturing the same.

According to the present invention, as an embodiment for accomplishing the object mentioned above, there is provided a display device, having a display panel, being constructed by adhering a first substrate and a second substrate with using a seal, wherein a main SOC for use of adjusting a gap distance is disposed like a wall, on a peripheral end portion of the first and second substrates, and the seal is disposed inwardly of the main SOC.

Also, according to the present invention, there is also provided a method for manufacturing a display device, comprising the following steps of:

a step for preparing a first substrate having plural numbers of display panel regions, each having an effective display region;

a step for forming a first organic film covering over the plural numbers of display panel regions on the first substrate;

a step for preparing a second substrate, having plural numbers of display panel regions, each having an effective display region, and being formed with a main SCO for use of adjusting a gap distance in a region including a cutting plane of the display panel region;

a step for forming a second organic film covering over the plural numbers of display panel regions on the second substrate;

a step for applying a seal on a region of the second substrate, including a region where the main SOC is formed and/or a region including a cutting plane of the display panel region of the first substrate;

a step for laminating the first substrate and the second substrate, so that the first organic film of the first substrate faces to the second organic film of the second substrate, and thereby adhering those to each other by the seal; and a step for cutting out the display panel region on the cutting plane, so that the main SOC is separated.

According to the present invention, it is possible to provide a display device having high reliability even if being narrowed with the frame thereof, and a method for manufacturing the same.

BRIEF DESCRIPTION OF THE DRAWINGS

Those and other objects, features and advantages of the present invention will become more readily apparent from the following detailed description when taken in conjunction with the accompanying drawings wherein:

FIG. 1 is a cross-sectional view of a principle portion (i.e., a seal portion) of a liquid crystal display device, according to a first embodiment of the present invention;

FIG. 2A is an entire plane view of the outlook of the liquid crystal display device, according to the first embodiment of the present invention;

FIG. 2B is an entire plane view of the outlook thereof, for explaining the positions where a main SOC and a seal are disposed, within the liquid crystal display device, according to the first embodiment of the present invention;

FIG. 6A is an outlook plane view of the conventional liquid crystal display panel (before cutting);

FIG. 6B is an outlook cross-sectional view of A-B portion of the liquid crystal display panel shown in FIG. 6A;

FIG. 7A is an outlook plane view of the liquid crystal display panel (before cutting), in relation with the studies made by the inventors and so on;

FIG. 7C is outlook cross-sectional view, for explaining deterioration of reliability of the liquid crystal display panel (after cutting), in relation with the studies made by the inventors and so on.

DETAILED DESCRIPTION OF THE PREFERRED EMBODIMENTS

Figure 7B:
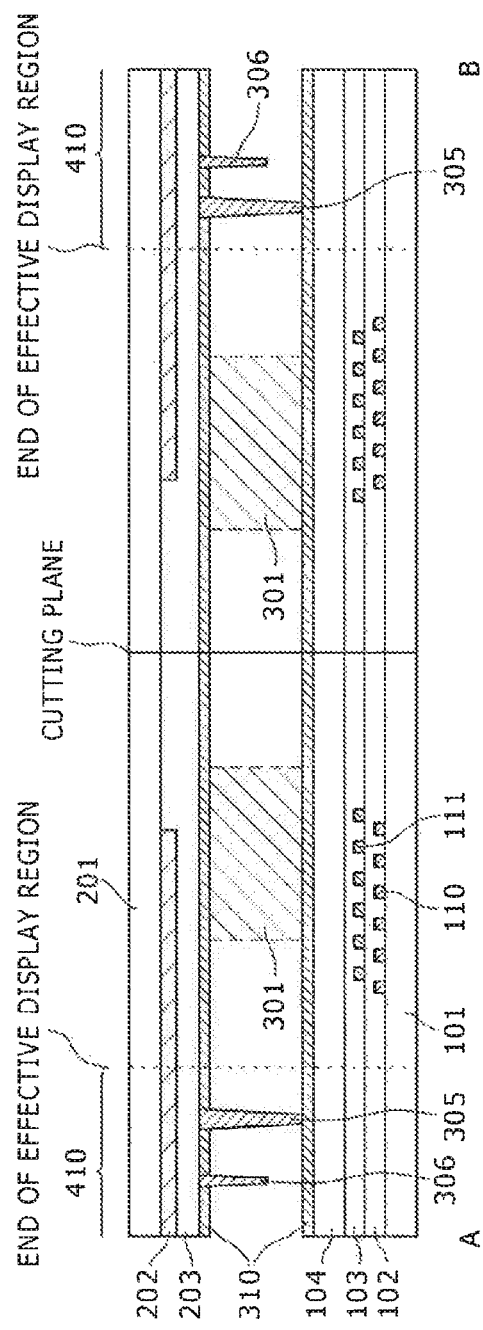
FIG. 7B is an outlook cross-sectional view of A-B portion of the liquid crystal display panel shown in FIG. 7A.

The inventors studied the reason of generating the black spots. As a result thereof, the followings come to be apparent on the cross-sectional view of the liquid crystal display panel shown in FIG. 7C; i.e., that an adhesiveness is deteriorated between the alignment film 310 and the seal 301, and that moisture intrudes therein from a boundary surface defined between the alignment film 310 and the over coating film (OC) 203 and also a boundary surface defined between the alignment film 310 and the seal 301, and this affects ill influences to the effective display region. Then, a main SOC (Space on color filter) is disposed like a wall in a region including the cutting plane of the liquid crystal display panel. With this, the narrow framing can be achieved, as well as, reducing/preventing the moisture from intruding therein, i.e., reducing/preventing of the black spots, and therefore it is possible to maintain the reliability for a long time-period. The main SOC can be formed only on one side of the four sides of the liquid crystal display panel, thereby obtaining an effect of reducing the black spots, but preferably, it is formed on all of those four sides. Also, a management can be omitted upon the printing size of the alignment film, and therefore it is possible to reduce the manufacturing cost thereof. Further, in the Japanese Patent Laid-Open No. 2007-304452, there is formed the alignment film in an outside of the structure provided for excluding the alignment film, then it is difficult to achieve the narrow framing, fully. Also, with the structure of the Japanese Patent Laid-Open No. 2007-148449, since the spacer within the seal is column-like, therefore it is impossible to prevent the moisture from intruding therein, fully.

Hereinafter, explanation will be given by referring to the embodiments. Although the explanation will be given on an example of liquid crystal display device; the present invention is also applicable to a display device, being construed by adhering 2 pieces of substrates with using a seal, and a method for manufacturing the same.

First Embodiment

A first embodiment of the present invention will be explained by referring to FIGS. 1 to 4. Herein, FIG. 2A is an entire plane view of the outlook of the liquid crystal display device according to the present embodiment. The present liquid crystal display device is constructed with a display region 400 and a driver circuit region 450. FIG. 2B is an entire plane view of the outlook thereof, for explaining the positions where a main SOC and a seal are disposed, within the liquid crystal display device, according to the first embodiment of the present invention. The main SOC is formed like a wall, surrounding the periphery of a liquid crystal display panel, and the seal 301 is disposed in a side of an effective display region (hereinafter, "inside") of the liquid crystal display panel, with respect to the main SOC. In the present embodiment, a sub SOC is further disposed inside the main SOC 302.

FIG. 1 is a cross-sectional view of a principle portion (i.e., a seal portion) of the liquid crystal display device according to the present embodiment. Within the present embodiment, the main SOC 302 having height of 3 μm and width of 0.2 mm is formed in a region including the cutting plane of the liquid crystal display panel, facing to a CF substrate. With this, after cutting into each liquid crystal display panel, since the main SOC 302 comes to be disposed on an outermost peripheral portion between the TFT side substrate 101 and the CF side substrate 201, it is possible to reduce/prevent the moisture from intruding into the effective display region 410. The main SOC 302 can be formed in a step same to that for forming a SOC 305 within the effective display region. In that instance, though it may be made at the same height, but with forming the SOC 305 within the effective display region to be lower than the height of the main SOC 302 in the height thereof, it is possible to reduce/prevent defects of periphery gaps due to bulging of the seal. The main SOC 302 can be formed of an organic material, such as, an acryl or an epoxy, etc., similar to the SOC 305 formed within the effective display region.

Also, in the present embodiment, plural numbers of sub SOCs 303 for use of interruption or stop are disposed within an inside of the main SOC 302. With this, even if the moisture passes through the main SOC 302, since the sub SOC 303 can elongate a route of intrusion of the moisture, then is possible to increase the reliability thereof, further. Lowering the height of the sub SOCs 303 than that of the main SOC 302 enables the seal 301, which is applied in the vicinity of the cutting plane of the liquid crystal display panel, to flow inside, if it is pushed out by the main SOC 302 when the TFT side substrate and the CF side substrate are piled up (i.e., enabling the seal to escape from). For the seal between the main SOC 302 and the alignment film 310 on the substrate facing to TFT, it is preferable to be pushed out, entirely, into inside. Even if remaining a little bit thereof, it does not matter, from a practical viewpoint. Also, those sub SOCs 303 are formed in the same step and of the same material to that of the main SOC 302.

Also, in the present embodiment, plural numbers of grooves are formed on the upper layer passivation film (UPS) 104 or the organic passivation film (FPS) 104 of the TFT side substrate, to be the interruption or stop. Thickness of the FPS, etc., is determined to 2 μm. With this, even in case where the moisture passes through the main SOC 302 by any change, since the route of intrusion of the moisture can be elongated by the grooves formed on the UPS 104 or the FPS 104, therefore it is possible to increase the reliability, further. Moreover, with such an arrangement thereof that those sub SOCs 303 and the grooves formed on the UPS 104 or the FPS 104 are piled up on each other, when seeing them from the above, vertically, since the alignment film, being pushed by the sub SOC, tries to enter into the groove portion, then it is possible to increase the adhesiveness between a groundwork film thereof.

Also, for the drain wiring (DCR) 111 and the gate wiring (GAL) 110, it is preferable to be disposed within inside (i.e., in a side of the effective display region) than the sub SOC 303. Also, it is preferable that the drain wiring (DCR) 111 and the gate wiring (GAL) 110 are disposed, not to be piled up on the sub SOC 303, when seeing them from the above, vertically. The drain wiring (DCR) 111 and the gate wiring (GAL) 110 are disposed, inside, separating by about 0.2 mm from the cutting plane.

Also, the SOC is formed on the color filter substrate (the CF substrate) side in FIG. 1, it may be formed on the TFT substrate side. Further, the color filter may be formed on the TFT substrate side. In consideration that the color filter is formed on the TFT substrate side, the CF substrate may be referred to as a counter substrate.

Figure 8:
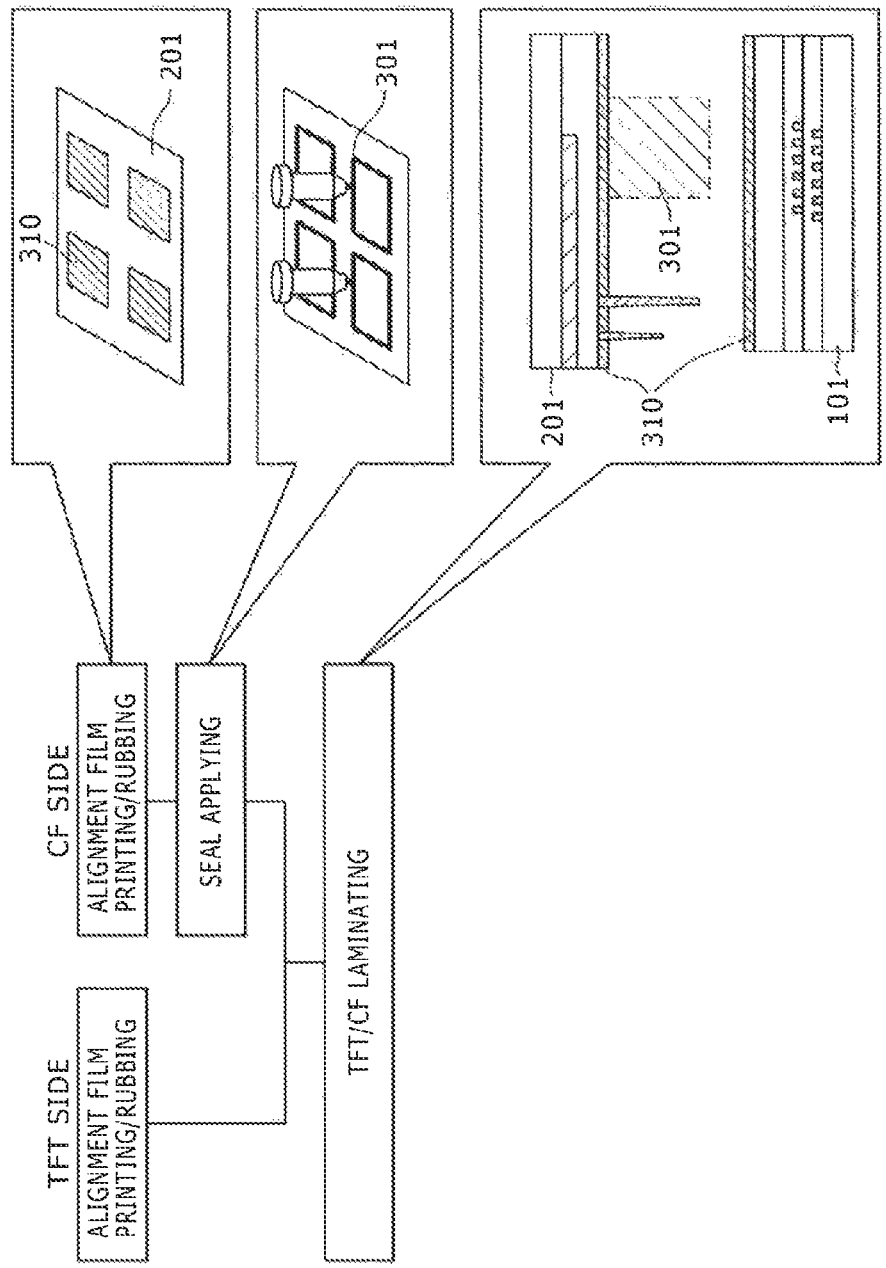
FIG. 8 is a flowchart of an outlook of steps, for explaining a method for manufacturing the liquid crystal display panel.

Next, an explanation will be given on a method for manufacturing the present liquid crystal display device, by referring to FIG. 8. First of all, in the same step that for forming the SOC 305 and the sub SOC 306 within the effective display region is prepared the CF side substrate, which is formed with the main SOC 302 and the sub SOCs 303 thereon. Next, in the present embodiment, on the TFT side substrate and the CF side substrate are formed the alignment films 310, not for each liquid crystal display panel, but covering over the plural numbers of the liquid crystal display panels. Thickness of the alignment film is determined to be 110 nm. Next, on the USP 104 or the FPS 104 of the TFT side substrate are formed the grooves through the alignment film 310. The process upon the TFT side substrate and the process upon the CF side substrate may be conducted, time-sequentially or in parallel with, simultaneously, and on the contrary thereto, the process upon the TFT side substrate may be conducted first. Next, the seal 301 is applied in the region, including the cutting plane of the CF side substrate therein. Width of the seal is determined to be 0.8 mm. The seal may be also applied on the TFT side substrate. Also, it may be applied on both the TFT side substrate and the CF side substrate. Following to this, the CF side substrate and the TFT side substrate are piled up, so that the surfaces, on which the alignment films are formed, are facing to each other, and they are adhered by the seal. When laminating each substrate, the seal 301 applied in the vicinity of the cutting plane of the liquid crystal display panel pushes the seal, which is pushed out by the main SOC 302, when the TFT side substrate and the CF side substrate are piled up, to flow inside, and thereby adjusts a gap distance between the substrates. Thereafter, it is cut into each liquid crystal display panel, and thereby completing the liquid crystal devices.

Figure 3:
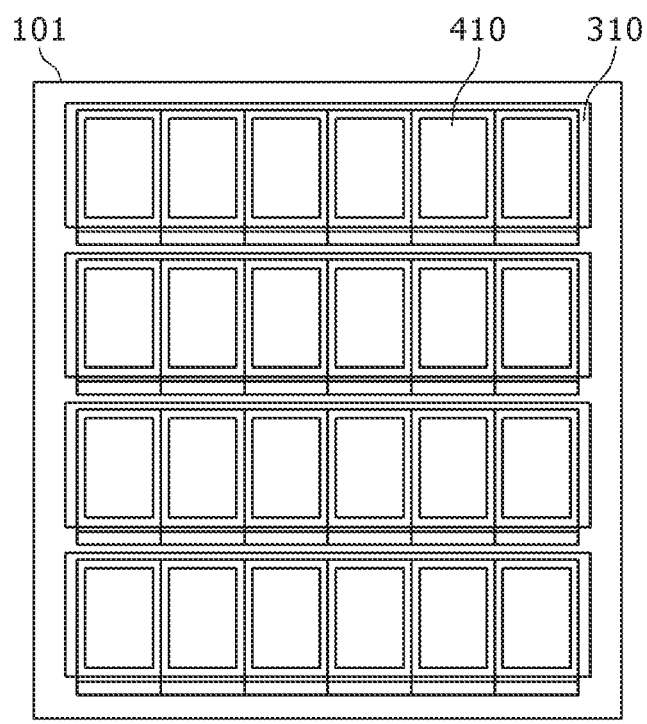
FIG. 3 is an outlook plane view (before cutting) for explaining a region where an alignment film is formed, within the liquid crystal display device, according to the first embodiment of the present invention.
Figure 4:
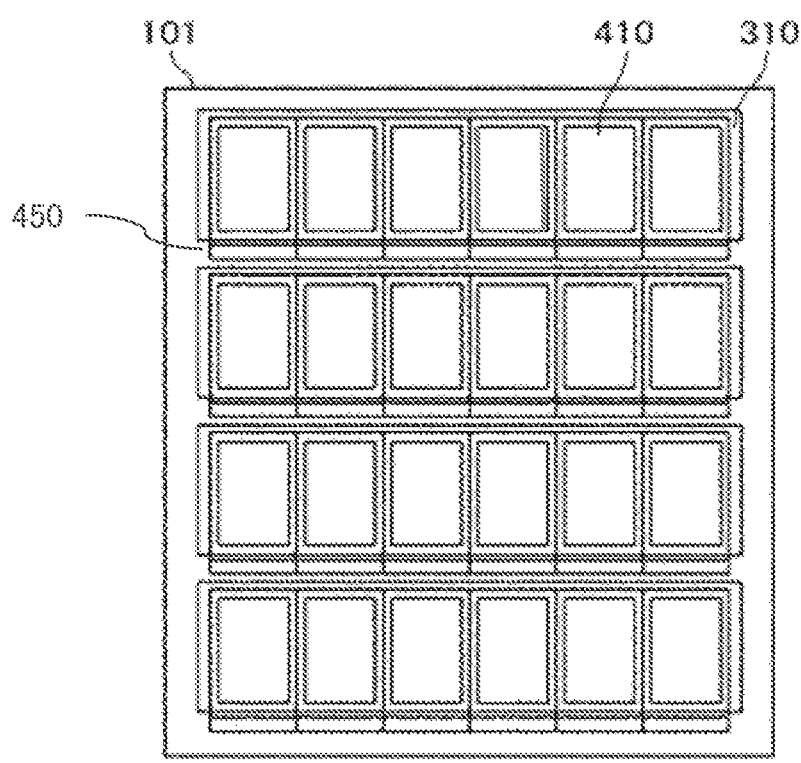
FIG. 4 is an outlook plane view (before cutting) for explaining a region where an alignment film is formed, within other liquid crystal display device, according to the first embodiment of the present invention.

In relation with the disposition or arrangement before cutting out the liquid crystal display panels, as is shown in FIG. 3, other than the case where there is a distance between the liquid crystal display panels neighboring with (i.e., the conventional arrangement), there can be considered the case where there is no distance between the liquid crystal display panels neighboring with (i.e., a full-just arrangement), as is shown in FIG. 4. The present embodiment can be applied, not only into such arrangement as shown in FIG. 3, but also into such arrangement as shown in FIG. 4.

With such arrangement of the liquid crystal display panels as shown in FIG. 4, the liquid crystal display device, having such the cross-section structure as shown in FIG. 1, is manufactured with applying the manufacturing method mentioned above, and as a result thereof, there is no generation of the black spot, and therefore, it is possible to obtain the liquid crystal display device having high reliability thereof.

As was mentioned above, according to the present embodiment, with provision of the main SOC in the region including the liquid crystal display panel, it is possible to provide a display device having high reliability and a method for manufacturing the same, even if it is the narrow framing type. Also, with such arrangement of the plural numbers of the sub SOCs inside the main SOC, it is possible to increase the reliability thereof, further. Also, with forming the plural numbers of grooves on the UPS or the FPS inside the main SOC through the alignment film, it is possible to increase the reliability thereof, much more. Also, with printing the alignment film covering over the plural numbers of liquid crystal display panels, there is no necessity of the management of printing size of the alignment film.

Second Embodiment

Figure 5:
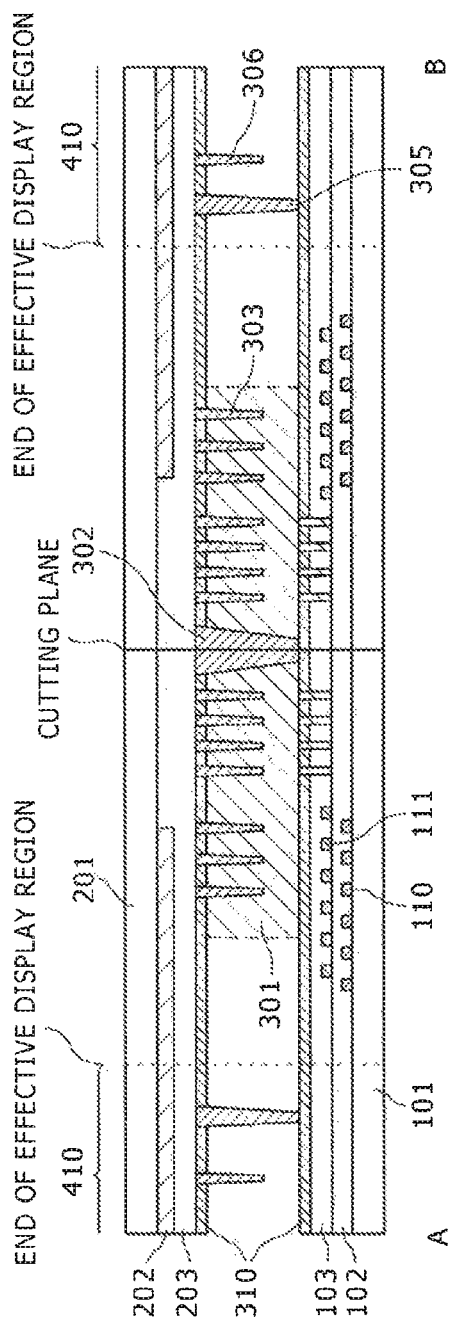
FIG. 5 is a cross-sectional view of a principle portion (i.e., a seal portion) of a liquid crystal display device, according to a second embodiment of the present invention.

An explanation will be given on a second embodiment of the present invention, by referring to FIG. 5. What is described in the first embodiment but not described in this embodiment may also be applied to this embodiment as long as there is no particular circumstance. FIG. 5 is a cross-sectional view of a principle portion (i.e., the seal portion) of the liquid crystal display device, according to the present embodiment. The difference between the present embodiment and the embodiment 1 lies in an aspect that, comparing to the fact that the upper layer passivation film (UPS) 104 or the organic passivation film (FPS) 104 is formed on the TFT side substrate in the embodiment 1, but according to the present embodiment, it does not have such UPS or FPS. Accompanying this, on the TFT side substrate, the alignment film 310 is formed on the inorganic passivation film (PAS). Other structural elements are same to those of the embodiment 1, and therefore the explanation thereof will be omitted herein.

In the present embodiment, plural numbers of grooves are formed on the inorganic passivation film (PAS), to be the interruption or stop. With this, even in the case where the moisture passes through the main SOC 302, since the grooves formed on the PAS 103 is able to elongate the route of intrusion of the moisture, it is possible to increase the reliability thereof, further. Moreover, with such an arrangement thereof that the sub SOCs 303 and the grooves formed on the PAS 103 are piled up on each other, when seeing them from the above, vertically, since the alignment film, being pushed by the sub SOC, tries to enter into the groove portion, therefore it is possible to increase the adhesiveness between a groundwork film thereof.

Next, an explanation will be given on a method for manufacturing the present liquid crystal display device, by referring to FIG. 8. However, neither UPS nor FPS is formed on the TFT side substrate. First of all, in the same step for forming the SOC 305 and the sub SOC 306 within the effective display region is prepared the CF side substrate, which is formed with the main SOC 302 and the sub SOCs 303 thereon. Next, in the present embodiment, on the TFT side substrate and the CF side substrate are formed the alignment films 310, not for each liquid crystal display panel, covering over the plural numbers of the liquid crystal display panels. Thickness of the alignment film is determined to be 110 nm. Next, on the PAS 103 of the TFT side substrate are formed the grooves through the alignment film 310. The process upon the TFT side substrate and the process upon the CF side substrate may be conducted, time-sequentially or in parallel with, simultaneously, and on the contrary thereto, the process upon the TFT side substrate may be conducted first. Next, the seal 301 is applied in the region, including the cutting plane of the CF side substrate therein. Width of the seal is determined to be 0.8 mm. Following to the above, the CF side substrate and the TFT side substrate are piled up, so that the surfaces, on which the alignment films are formed, are facing to each other, and they are adhered by the seal. When laminating each substrate, the seal 301 applied in the vicinity of the cutting plane of the liquid crystal display panel pushes the seal, which is pushed out by the main SOC 302, when the TFT side substrate and the CF side substrate are piled up, to flow inside, and thereby adjusts a gap distance between the substrates. Thereafter, it is cut into each liquid crystal display panel, and thereby completing the liquid crystal devices.

With such arrangement of the liquid crystal display panels as shown in FIG. 4, the liquid crystal display device, having such cross-section structure as shown in FIG. 5, is manufactured with applying the manufacturing method mentioned above, and as a result thereof, there is no generation of the black spot, and therefore it is possible to obtain the liquid crystal display device having high reliability thereof.

As was mentioned above, according to the present embodiment, with provision of the main SOC in the region including the liquid crystal display panel, it is possible to provide a display device having high reliability and a method for manufacturing the same, even if it is the narrow framing type. Also, with the arrangement of the plural numbers of the sub SOCs inside the main SOC, it is possible to increase the reliability thereof, further. Also, with forming the plural numbers of grooves on the PAS inside the main SOC through the alignment film, it is possible to increase the reliability therefore, much more. Also, with printing the alignment film covering over the plural numbers of liquid crystal display panels, there is no necessity of the management of printing size of the alignment film.

The present invention should not be limited to those embodiments mentioned above, but may includes various modifications thereof. For example, the embodiments mentioned above are explained in the details thereof, for the purpose of easy understanding of the present invention, and the present invention should not be necessarily restricted to that comprising all of the constituent elements mentioned above. Also, a part of constituent element(s) of a certain embodiment can be replaced by the constituent element(s) of the other embodiment, or the constituent element(s) of the other embodiment can be added to the constituent element(s) of the certain embodiment. Also, a part of the constituent element(s) of each embodiment can be added/deleted/replaced by other constituent element(s).

What is claimed is:

1. A liquid crystal display device comprising:
a first substrate having a glass substrate, a first alignment film, an organic passivation film between the glass substrate and the first alignment film, a first inorganic passivation film between the glass substrate and the organic passivation film, a second inorganic passivation film between the first inorganic passivation film and the organic passivation film, a gate wiring between the glass substrate and the first inorganic passivation film, and drain wirings between the first inorganic passivation film and the second inorganic passivation film;
a second substrate having a second alignment film; and
a seal contacting the first alignment film and the second alignment film, wherein
the first substrate has a first region and a second region,
the first region overlaps with the second substrate,
the second region does not overlap with the second substrate,
a border between the first region and the second region is a first outside edge of the second substrate,
in the first region, the glass substrate has a second outside edge, a third outside edge parallel to the second outside edge, and a fourth outside edge parallel to the border,
the first alignment film overlaps with the second outside edge, the third outside edge and the fourth outside edge in the first region,
the organic passivation film has a groove,
the groove overlaps the seal in the first region, and
the gate wiring overlaps the seal and the groove.

2. The liquid crystal display device according to claim 1, wherein
the drain wirings overlap the seal, and
the drain wirings do not overlap the groove.

3. The liquid crystal display device according to claim 1, wherein
the drain wirings overlap the seal, and
a bottom of the groove exposes the second inorganic passivation film between two adjacent drain wirings.

4. The liquid crystal display device according to claim 1, wherein
the second substrate has a second outside edge, a third outside edge parallel to the second outside edge, and a fourth outside edge parallel to the first outside edge,
the second outside edge of the glass substrate overlaps the second outside edge of the second substrate,
the third outside edge of the glass substrate overlaps the third outside edge of the second substrate,
the fourth outside edge of the glass substrate overlaps the fourth outside edge of the second substrate, and
the first alignment film overlaps with the second outside edge of the second substrate, the third outside edge of the second substrate, and the fourth outside edge of the second substrate in the first region.

5. The liquid crystal display device according to claim 1, wherein
an end portion of the first alignment film along the border in the first region does not overlap with the border.

6. The liquid crystal display device according to claim 1, wherein
the first substrate has a display region and a frame portion outside of the display region in the first region,
the seal is provided on the frame region, and
an end portion of the first alignment film along the border is between the border and the display region.

7. The liquid crystal display device according to claim 1, further comprising a driver circuit mounted on the second region, wherein
the first alignment film does not overlap the second region.

8. The liquid crystal display device according to claim 1, further comprising a driver circuit mounted on the second region, wherein
the first alignment film does not overlap an area where the driver circuit is provided in the second region.

* * * * *